(12) United States Patent
Danielson et al.

(10) Patent No.: US 9,120,559 B2
(45) Date of Patent: Sep. 1, 2015

(54) PROPELLER BLADE PITCH ACTUATION SYSTEM

(75) Inventors: David R. Danielson, Suffield, CT (US); Paul A. Carvalho, Hadley, MA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 786 days.

(21) Appl. No.: 13/449,483

(22) Filed: Apr. 18, 2012

(65) Prior Publication Data
US 2013/0280065 A1 Oct. 24, 2013

(51) Int. Cl.
B64C 11/06 (2006.01)
B64C 11/38 (2006.01)

(52) U.S. Cl.
CPC ..................... B64C 11/38 (2013.01)

(58) Field of Classification Search
CPC ...... B64C 11/38; B64C 11/385; B64C 11/40; F01D 7/00; F01D 7/02; F05D 2260/74; F05D 2260/76; F05D 2270/56; F05D 2270/64
USPC ........... 416/1, 27, 30, 36, 38, 43; 60/405, 486
See application file for complete search history.

(56) References Cited

U.S. PATENT DOCUMENTS

| | | | |
|---|---|---|---|
| 3,067,825 A | 12/1962 | Chilman et al. | |
| 5,213,471 A * | 5/1993 | Miller et al. | 416/44 |
| 6,019,717 A * | 2/2000 | Herman | 494/49 |
| 6,077,040 A | 6/2000 | Pruden et al. | |
| 6,422,816 B1 | 7/2002 | Danielson | |
| 6,811,376 B2 | 11/2004 | Arel et al. | |
| 6,845,614 B2 * | 1/2005 | Stahlman | 60/468 |
| 7,172,391 B2 | 2/2007 | Carvalho | |
| 7,976,279 B2 | 7/2011 | Raes et al. | |
| 2005/0135929 A1 | 6/2005 | Waddleton | |

FOREIGN PATENT DOCUMENTS

EP 1623921 A1 2/2006

OTHER PUBLICATIONS

The European Search Report mailed May 4, 2015 for European Application No. 13163302.6.

* cited by examiner

*Primary Examiner* — Dwayne J White
*Assistant Examiner* — Alexander White
(74) *Attorney, Agent, or Firm* — Kinney & Lange, P.A.

(57) ABSTRACT

A propeller blade pitch actuation system includes a propeller control module (PCM), a PCM drain line, a first drain line, a drain line restriction, a second drain line, and a valve. The PCM drain line connects to the PCM to drain hydraulic fluid. The first drain line is downstream of the PCM drain line and the drain line restriction is downstream of the first drain line. The second drain line is downstream of the PCM drain line. The valve includes a first valve position and a second valve position. The first valve position connects the PCM drain line to the first drain line and the second valve position connects the PCM drain line to the second drain line. Hydraulic pressure of the first drain line between the valve and the drain line restriction is greater than hydraulic pressure of the second drain line.

18 Claims, 4 Drawing Sheets

PROPELLER BLADE PITCH ACTUATION SYSTEM

BACKGROUND

The present invention relates to a propeller blade pitch actuation system. In particular, the invention relates to increasing a pressure force available for changing the pitch of a propeller blade.

Propeller driven aircraft typically include a system for adjusting the pitch of each propeller blade. Blade pitch generally ranges from a fine pitch position, where the blade has a low level of attack, to a coarse pitch position, where the blade has a high angle of attack. In the fine pitch position, the blade moves relatively little air with each rotation, permitting operation when little forward thrust is desired. When more thrust is desired, the blade pitch becomes coarser, moving more air with each rotation. Increased engine power and gears between the engine and the propeller provide the increased torque necessary to keep the propeller moving at a desired speed as the blade pitch becomes coarser. At the extreme coarse pitch position, or feathered position, the blade is pitched in the direction of flight to minimize propeller drag in the event of engine failure. At the other extreme, the blade is pitched past the fine pitch position to a negative angle of attack to produce reverse thrust. Reverse thrust may be employed to slow the aircraft once it has landed. In either forward or reverse thrust conditions, as the blade pitch moves away from a fine pitch position, increasingly greater force is required to adjust the blade pitch.

Generally, blade pitch changes are driven by a propeller actuator connected by a trunnion pin to each blade. The propeller actuator is a translating piston which moves when a pressure force, in the form of a hydraulic pressure difference, is applied to the piston. The translation of the piston is transmitted through the trunnion pin to the blade which rotates on a bearing assembly. Providing a pressure force sufficient to move the blade pitch to full coarse and full reverse positions under desired operating conditions often requires a high-pressure hydraulic pump to provide the necessary hydraulic pressure. In addition, a propeller actuator, hydraulic lines and fittings must be strong enough to withstand the hydraulic pressure. Increasing the pressure force by increasing the hydraulic pressure requires increasingly heavy or expensive pumps, pressure actuators, lines, and fittings. This is of particular concern on aircraft, where weight is a key factor in the economical operation of the aircraft. Thus, there is a need to provide a pressure force sufficient to move the blade pitch throughout its range under desired operating conditions, while reducing the cost or weight penalty of the high-pressure pump, pressure actuator, lines, and fittings.

SUMMARY

The present invention is a propeller blade pitch actuation system including a propeller control module (PCM), a PCM drain line, a first drain line, a drain line restriction, a second drain line, and a valve. The PCM adjusts blade pitch on at least one propeller blade. The PCM drain line is connected to the PCM to drain hydraulic fluid employed in adjusting the propeller blade pitch. The first drain line is downstream of the PCM drain line and the drain line restriction is downstream of the first drain line. The second drain line is downstream of the PCM drain line. The valve includes a first valve position and a second valve position. The first valve position connects the PCM drain line to the first drain line and the second valve position connects the PCM drain line to the second drain line. Hydraulic pressure of the first drain line between the valve and the drain line restriction is greater than hydraulic pressure of the second drain line.

DETAILED DESCRIPTION

A propeller actuator is controlled by a propeller control module (PCM), which supplies hydraulic fluid from a high-pressure pump to a chamber on one side of the propeller actuator piston while draining hydraulic fluid from a chamber on the other side of the piston. A combination of the pressure difference between the two chambers and differential areas of the chambers results in the hydraulic pressure force that moves the piston, thus changing blade pitch. The pressure difference between the chambers is limited by the hydraulic pressure available from the high-pressure pump and the hydraulic pressure in the PCM drain line. In some powerplant lubrication and blade pitch actuation systems, hydraulic fluid in the PCM drain line flows to other components and is employed by those components. The use of the hydraulic fluid by those components restricts the flow of hydraulic fluid in the drain line downstream from the PCM drain line. Back pressure from such drain line restrictions downstream from the PCM drain line increase the hydraulic pressure in the PCM drain line, reducing the hydraulic pressure force available to move the piston.

The present invention is a propeller blade pitch actuation system employing a valve to selectively connect a PCM drain line to either a drain line having a drain line restriction or, under conditions where a larger pressure force is required by the PCM, to a lower pressure drain line not having the drain line restriction. In some embodiments, the ability to switch to a lower pressure drain line under conditions calling for a greater hydraulic pressure force to move the propeller actuator piston permits the use of lighter or less expensive pumps, pressure actuators, lines, and fittings. In some embodiments, bypassing the drain line restriction to provide increased pressure force is employed only when the aircraft is on the ground, such as when full reverse is desired, and when bypassing the drain line restriction for such a short time is not detrimental to the operation or longevity of the aircraft.

Figure 1:
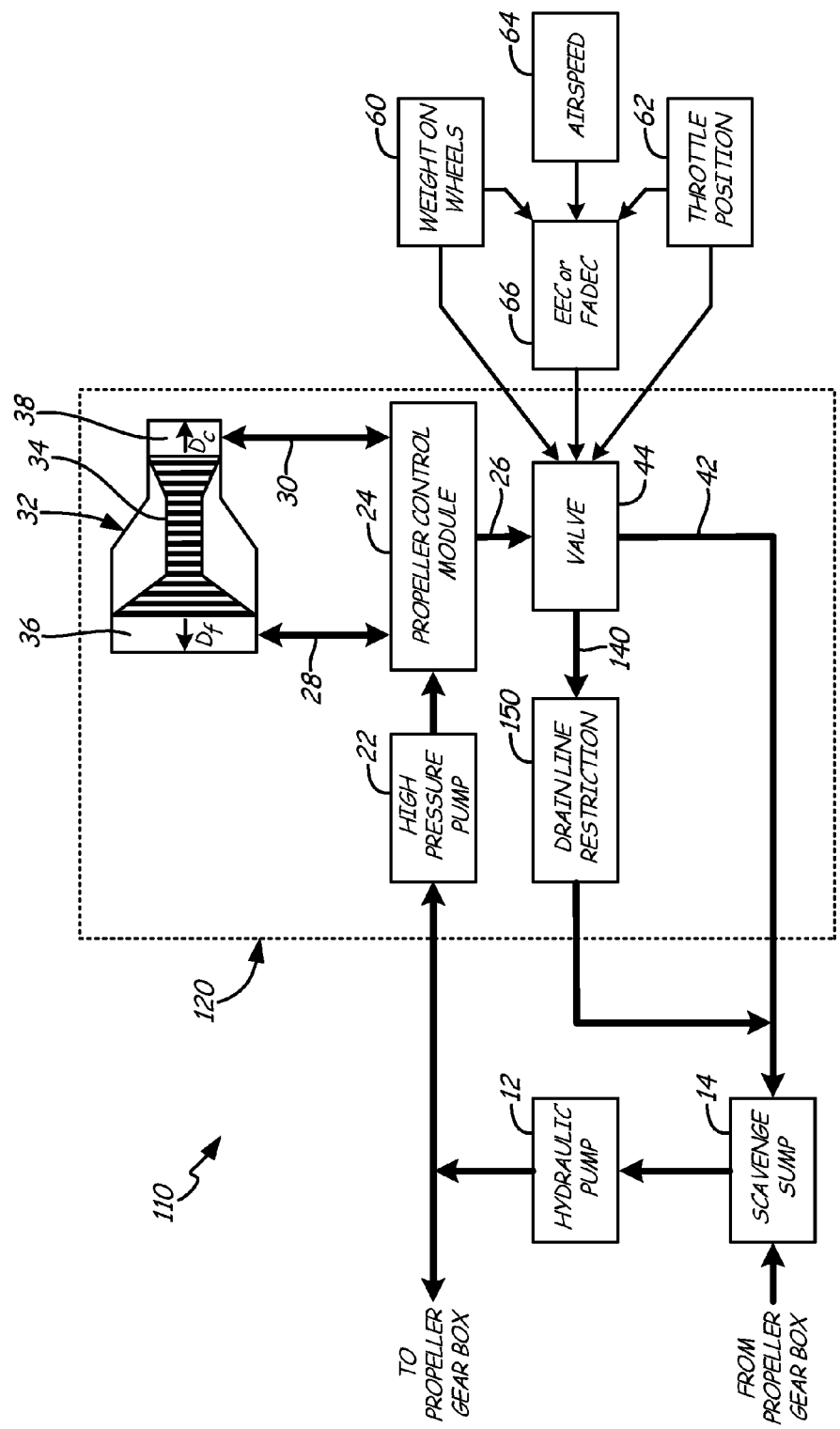
FIG. 1 is a schematic representation of a powerplant lubrication and blade pitch actuation system embodying the present invention.

FIG. 1 is a schematic representation of a powerplant lubrication and blade pitch actuation system embodying the present invention. FIG. 1 illustrates a portion of powerplant lubrication and blade pitch actuation system 110 including hydraulic pump 12, scavenge sump 14, and propeller blade pitch actuation system 120. Propeller blade pitch actuation system 120 includes high pressure pump 22, propeller control module (PCM) 24, PCM drain line 26, coarse pitch hydraulic line 28, fine pitch hydraulic line 30, propeller actuator 32, first drain line 140, second drain line 42, valve 44, and drain line restriction 150. Propeller actuator 32 includes propeller actuator piston 34, coarse pitch hydraulic chamber 36, and fine pitch hydraulic chamber 38.

As shown in FIG. 1, hydraulic pump 12 is connected by hydraulic lines on one side to high-pressure pump 22 and to a propeller gear box (not shown). High-pressure pump 22 is connected to PCM 24. PCM 24 is connected to valve 44 by way of PCM drain line 26. PCM 24 is also connected to propeller actuator 32 at coarse pitch hydraulic chamber 36 by coarse pitch hydraulic line 28 and at fine pitch hydraulic chamber 38 by fine pitch hydraulic line 30. Propeller actuator piston 34 is within propeller actuator 32, bounded on one end by coarse pitch hydraulic chamber 36 and on an opposite end by fine pitch hydraulic chamber 38. Propeller actuator piston 34 is also connected to a blade (not shown) by way of a trunnion (not shown), as discussed above. Valve 44 is connected to a first drain line 140 and second drain line 42. First drain line 140 is connected to drain line restriction 150. Drain line restriction 150 and second drain line 42 both connect to scavenge sump 14, as does a return hydraulic line from the propeller gear box. Scavenge sump 14 is connected to hydraulic pump 12 to complete a hydraulic circulation loop.

In operation, hydraulic pump 12 pumps hydraulic fluid from scavenge sump 14 to high-pressure pump 22, as well as to the propeller gear box for lubrication of the gear box. High-pressure pump 22 increases the pressure of the hydraulic fluid for use by PCM 24. PCM 24 selectively connects the pressurized hydraulic fluid from high-pressure pump 22 to one of either coarse pitch hydraulic line 28 or fine pitch hydraulic line 30 and connects PCM drain line 26 to the other one of coarse pitch hydraulic line 28 or fine pitch hydraulic line 30, depending on the desired blade pitch change direction. For example, if it is desired to move the blade pitch toward a fine pitch position, as indicated by the movement of propeller actuator piston 34 in fine pitch direction Df, PCM 24 connects the pressurized hydraulic fluid from high-pressure pump 22 to fine pitch hydraulic line 30, pressurizing fine pitch hydraulic chamber 38. At the same time, PCM 24 connects coarse pitch hydraulic line 28 to PCM drain line 26, reducing the pressure within coarse pitch hydraulic chamber 36 to that of PCM drain line 26. The pressure and area differences between the two chambers creates a hydraulic pressure force that causes propeller actuator piston 34 to move in fine pitch direction Df as hydraulic fluid fills an expanding fine pitch hydraulic chamber 38 and drains from a shrinking coarse pitch hydraulic chamber 36. If it is desired to move the blade pitch toward a coarse pitch position, as indicated by the movement of propeller actuator piston 34 in coarse pitch direction Dc, PCM 24 connects the pressurized hydraulic fluid from high-pressure pump 22 to coarse pitch hydraulic line 28, pressurizing coarse pitch hydraulic chamber 36. At the same time, PCM 24 connects fine pitch hydraulic line 30 to PCM drain line 26, reducing the pressure within fine pitch hydraulic chamber 38 to that of PCM drain line 26. Once again, the pressure and area differences between the two chambers create a hydraulic pressure force that causes propeller actuator piston 34 to move, this time in coarse pitch direction Dc as hydraulic fluid fills an expanding coarse pitch hydraulic chamber 36 and drains from a shrinking fine pitch hydraulic chamber 38.

Hydraulic fluid in PCM drain line 26 flows to valve 44. As illustrated in FIG. 1, valve 44 is an electromechanical valve, such as a solenoid valve, and is electrically selectable to be in one of two valve positions: a first valve position and a second valve position. When valve 44 is in the first valve position, hydraulic fluid flows from PCM drain line 26, through valve 44, into first drain line 140 to drain line restriction 150. Drain line restriction 150 employs the hydraulic fluid from first drain line 140 to perform a function generally useful during operation of the aircraft, particularly when in flight. However, to perform this function, drain line restriction 150 necessarily creates a back pressure in PCM drain line 26, increasing the hydraulic pressure in PCM drain line 26. Such an increase in the pressure of PCM drain line 26 reduces the pressure difference between fine pitch hydraulic chamber 38 and coarse pitch hydraulic chamber 36, reducing the hydraulic pressure force available to move propeller actuator piston 34 and change the propeller blade pitch. From drain line restriction 150, hydraulic fluid flows to scavenge sump 14 where it is available once again to hydraulic pump 12.

When valve 44 is in the second valve position, hydraulic fluid flows from PCM drain line 26, through valve 44, into second drain line 42, and into scavenge sump 14. Scavenge sump 14 typically represents one of the lowest drain line pressures available in powerplant lubrication and blade pitch actuation system 110. Thus, when valve 44 connects PCM drain line 26 to second drain line 42, the pressure of PCM drain line 26 decreases to one of the lowest drain line pressures available in powerplant lubrication and blade pitch actuation system 110. Such a decrease in the pressure of PCM drain line 26 increases the pressure difference between fine pitch hydraulic chamber 38 and coarse pitch hydraulic chamber 36, increasing the hydraulic pressure force available to move propeller actuator piston 34 and change the propeller blade pitch. However, in doing so, drain line restriction 150 is bypassed and, because it no longer receives the hydraulic fluid from first drain line 140, drain line restriction 150 can no longer perform the function generally useful during operation of the aircraft. Thus, valve 44 may be directed to bypass drain line restriction 150 to provide increased pressure force only when the increased pressure force is necessary for a limited time and when bypassing drain line restriction 150 for the limited time is not detrimental to the operation or longevity of the aircraft.

As shown in the embodiment of FIG. 1, the surface area of propeller actuator piston 34 bounding coarse pitch hydraulic chamber 36 is significantly larger than the surface area of propeller actuator piston 34 bounding fine pitch hydraulic chamber 38. This reflects the significantly increased pressure force required to move the blade in coarse pitch direction Dc as compared to the force required to move the blade in fine pitch direction Df, as discussed above. This piston area asymmetry works well during normal flight conditions and conditions where forward thrust is desired by effectively reducing the pressure high-pressure pump 22 must produce to move propeller actuator piston 34 in coarse pitch direction Dc. However, under some conditions, such as full reverse thrust upon landing, this area imbalance makes it more difficult to move the blade past the fine pitch position to a negative pitch position required to produce full reverse thrust. Embodiments of the present invention solve this problem by selecting the second valve position of valve 44 when reverse thrust is required. By connecting PCM drain line 26 to second drain line 42, the hydraulic pressure force available to move propeller actuator piston 34 is increased enough to move the blade to the negative pitch position required to produce full reverse thrust. Thus, a pressure force is provided that is sufficient to move the blade pitch throughout its range under desired operating conditions without resorting to heavier or more expensive components.

Generally, reverse thrust is selected once the aircraft has landed. In the embodiment illustrated in FIG. 1, valve 44 may switch from the first valve position to the second valve position in response to a signal indicating the aircraft is not in flight. As shown in FIG. 1, valve 44 is electrically connected to weight on wheels sensor 60, throttle position sensor 62 and Electronic Engine Control (EEC) or Full Authority Digital Engine Control (FADEC) 66. Airspeed sensor 64 is electrically connected to EEC or FADEC 66, as are weight on wheels sensor 60 and throttle position 62. Weight on wheels sensor 60 detects weight on at least one aircraft landing gear wheel and produces a corresponding electrical signal. Throttle position sensor 62 detects a position of an engine throttle indicating a reverse throttle selection and produces a corresponding electrical signal. Airspeed sensor 64 measures airspeed and produces a corresponding electrical signal. EEC or FADEC 66 is an electronic control system that receives cockpit commands in the form of a signal indicative of a performance level required from an engine, in addition to signals from a variety of sensors and other systems around the engine and the aircraft. EEC or FADEC 66 applies a set of control rules to the received signals and determines control signals to send to systems on and around the engine, including valve 44 and PCM 24 (electrical connection to PCM 24 not shown).

It is understood that not all of the signaling connections illustrated in FIG. 1 are required for operation of the embodiment, but are alternatives that may be employed alone or in combination to direct the switching of valve 44. For example, upon landing, weight on wheels sensor 60 detects weight on at least one aircraft landing gear wheel, producing an electrical signal. Weight on wheels sensor 60 may send an electrical signal to valve 44 directly to switch valve 44 from the first valve position to the second valve position, providing the increased pressure force necessary to move the blade to full reverse thrust. In another example, throttle position sensor 62 may instead be employed to signal valve 44 directly once a reverse throttle position is detected. Alternatively, EEC or FACED 66 may determine, based on the signal from airspeed sensor 64 indicating that measured airspeed is below an airspeed necessary for the aircraft to be in flight, that the aircraft has landed and reverse thrust is required. Then EEC or FADEC 66 sends an electrical signal to valve 44 causing it to switch to the second valve position to provide the increased pressure force necessary for full reverse thrust. Alternatively, EEC or FADEC 66 may send an electrical signal to valve 44 based on electrical signals from weight on wheels sensor 60, throttle position sensor 62, or airspeed sensor 64 or any combination of these sensors. It is further understood that, although valve 44 is illustrated as an electromechanical valve, the present invention encompasses embodiments in which the valve is signaled by other means, including pneumatic, hydraulic, or mechanical means.

Figure 2:
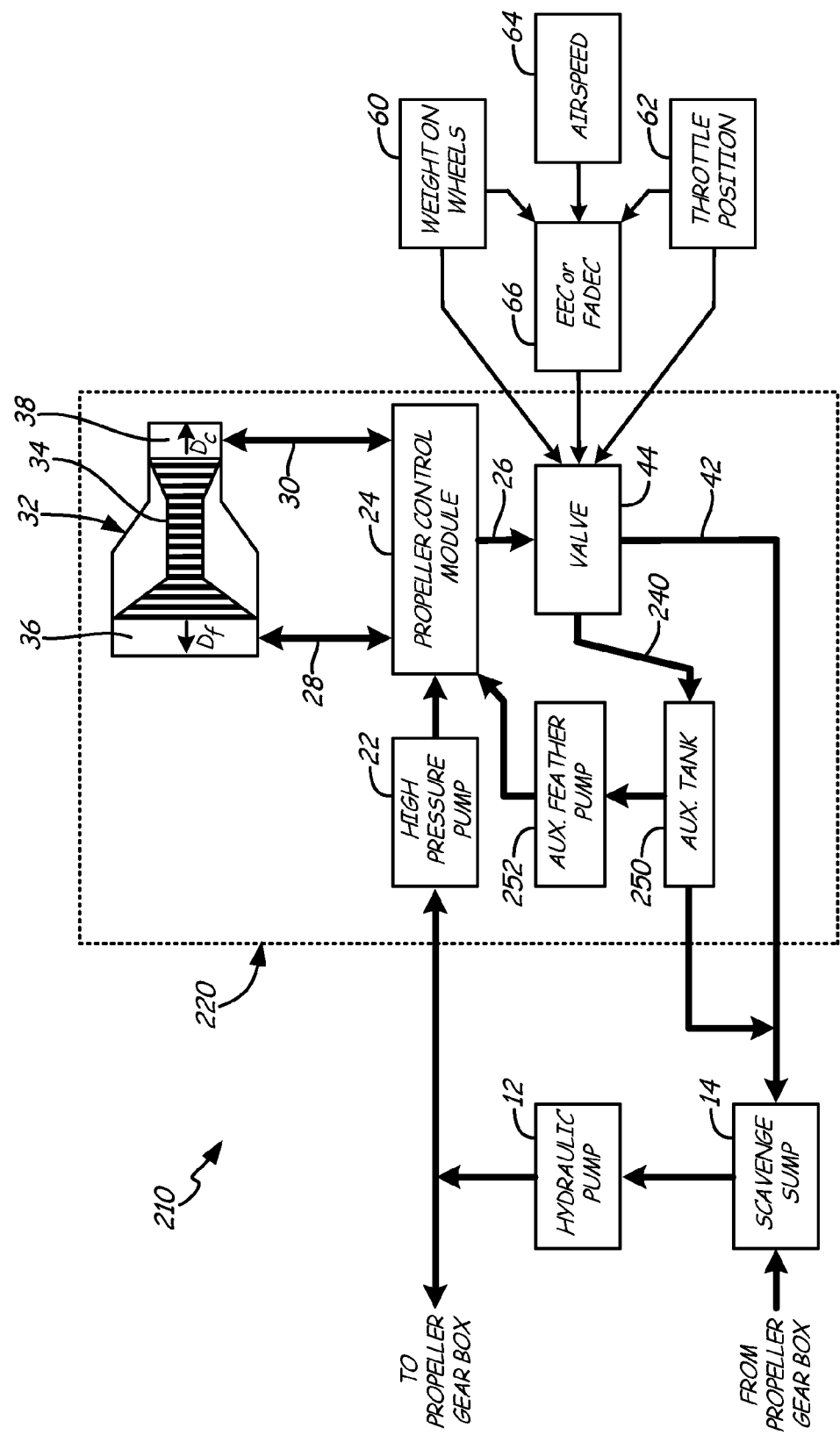
FIG. 2 is a schematic representation of another embodiment of a powerplant lubrication and blade pitch actuation system of the present invention.

FIG. 2 is a schematic representation of another embodiment of a powerplant lubrication and blade pitch actuation system of the present invention. The embodiment of FIG. 2 is like the embodiment of FIG. 1, except that in propeller blade pitch actuation system 220 of powerplant lubrication and blade pitch actuation system 210, the drain line restriction is auxiliary tank 250. Auxiliary tank 250 is connected to PCM 24 by auxiliary feather pump 252. Auxiliary tank 250 is a tank for storing hydraulic fluid to be employed by PCM 24 in the event of a failure of a supply of hydraulic fluid to propeller blade pitch actuation system 220. For example, in the event of engine failure, hydraulic pump 12, which is generally driven from the aircraft engine, may fail to provide hydraulic fluid to high-pressure pump 22, leaving PCM 24 unable to control blade pitch. Under such circumstances, moving the blade pitch to a feathered position is critical to maintaining control of the aircraft. Auxiliary tank 250 stores just enough hydraulic fluid for PCM 24, by way of auxiliary feather pump 252, to provide the pressure force necessary for feathering the propeller blades. Thus, auxiliary tank 250 employs the hydraulic fluid from first drain line 240 to perform a function generally useful during operation of the aircraft—providing a reservoir of hydraulic fluid sufficient to feather the propeller in the event of engine failure. This function is generally only of critical importance when the aircraft is in flight. Thus, in the embodiment of FIG. 2, valve 44 may be directed to bypass auxiliary tank 250 to provide increased pressure force for reverse thrust while landing. During landing, the increased pressure force is necessary for a limited time (while landing) and bypassing auxiliary tank 250 while landing is not detrimental to the operation or longevity of the aircraft.

Figure 3:
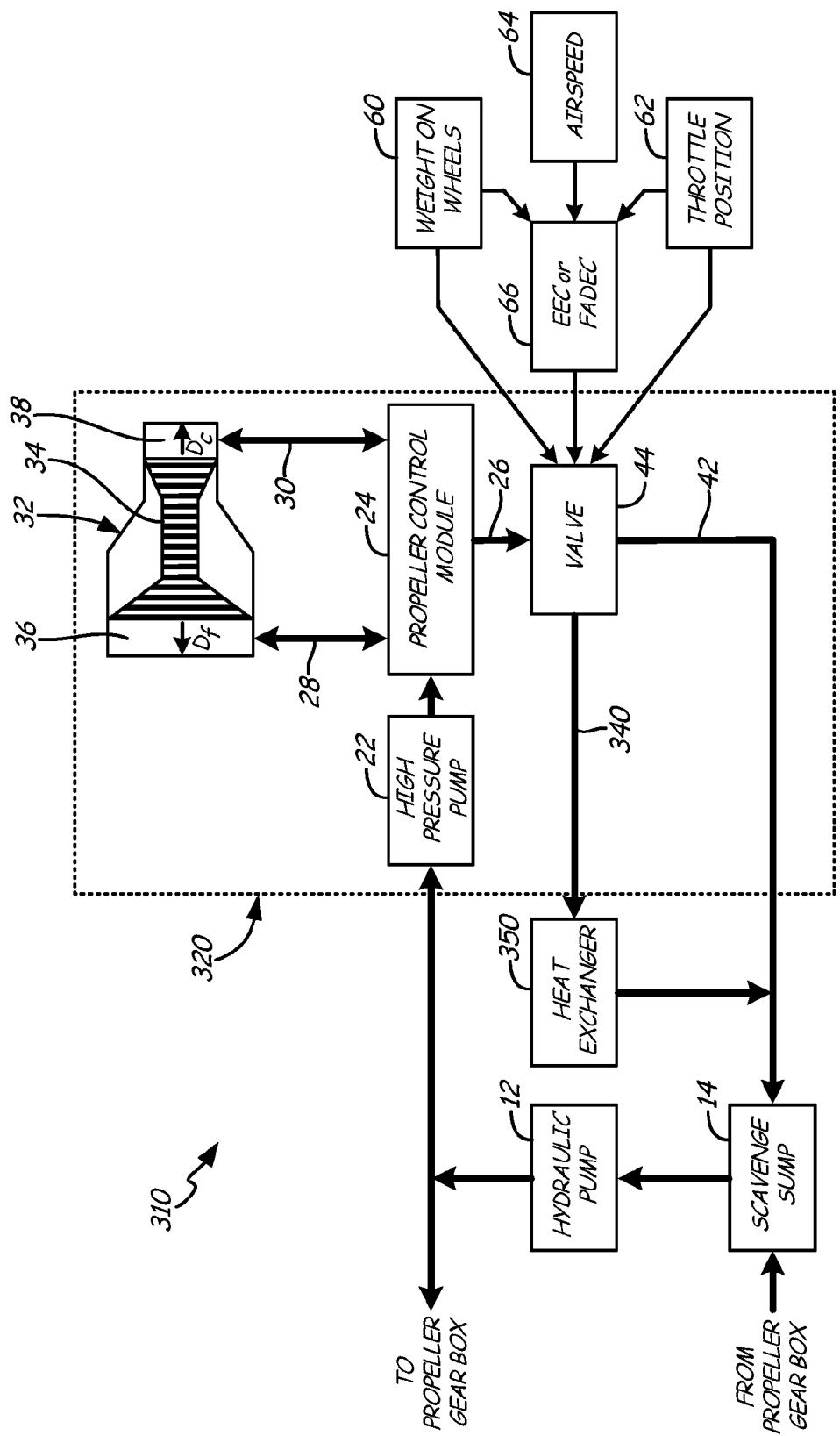
FIG. 3 is a schematic representation of another embodiment of a powerplant lubrication and blade pitch actuation system of the present invention.

FIG. 3 is a schematic representation of another embodiment of a powerplant lubrication and blade pitch actuation system of the present invention. The embodiment of FIG. 3 is like the embodiment of FIG. 1, except that in powerplant lubrication and blade pitch actuation system 310, the drain line restriction is heat exchanger 350. Heat exchanger 350 employs the hydraulic fluid from first drain line 340 to perform a function generally useful during operation of the aircraft—transferring heat between the hydraulic fluid employed in PCM 24 to another fluid stream. For example, the hydraulic fluid may absorb heat from mechanical components (e.g. the gear box, hydraulic pump 12, high-pressure pump 22, etc.) and need to be cooled by transferring heat to a cooling airstream. In another example, the heat of the hydraulic fluid may be employed in heat exchanger 350 to preheat fuel for the aircraft engine. This function is generally only of critical importance when the aircraft is in flight. Thus, in the embodiment of FIG. 3, valve 44 may be directed to bypass heat exchanger 350 to provide increased pressure force for reverse thrust while landing. During landing, the increased pressure force is necessary for a limited time (while landing) and bypassing heat exchanger 350 for a limited time is not detrimental to the operation or longevity of the aircraft.

Figure 4:
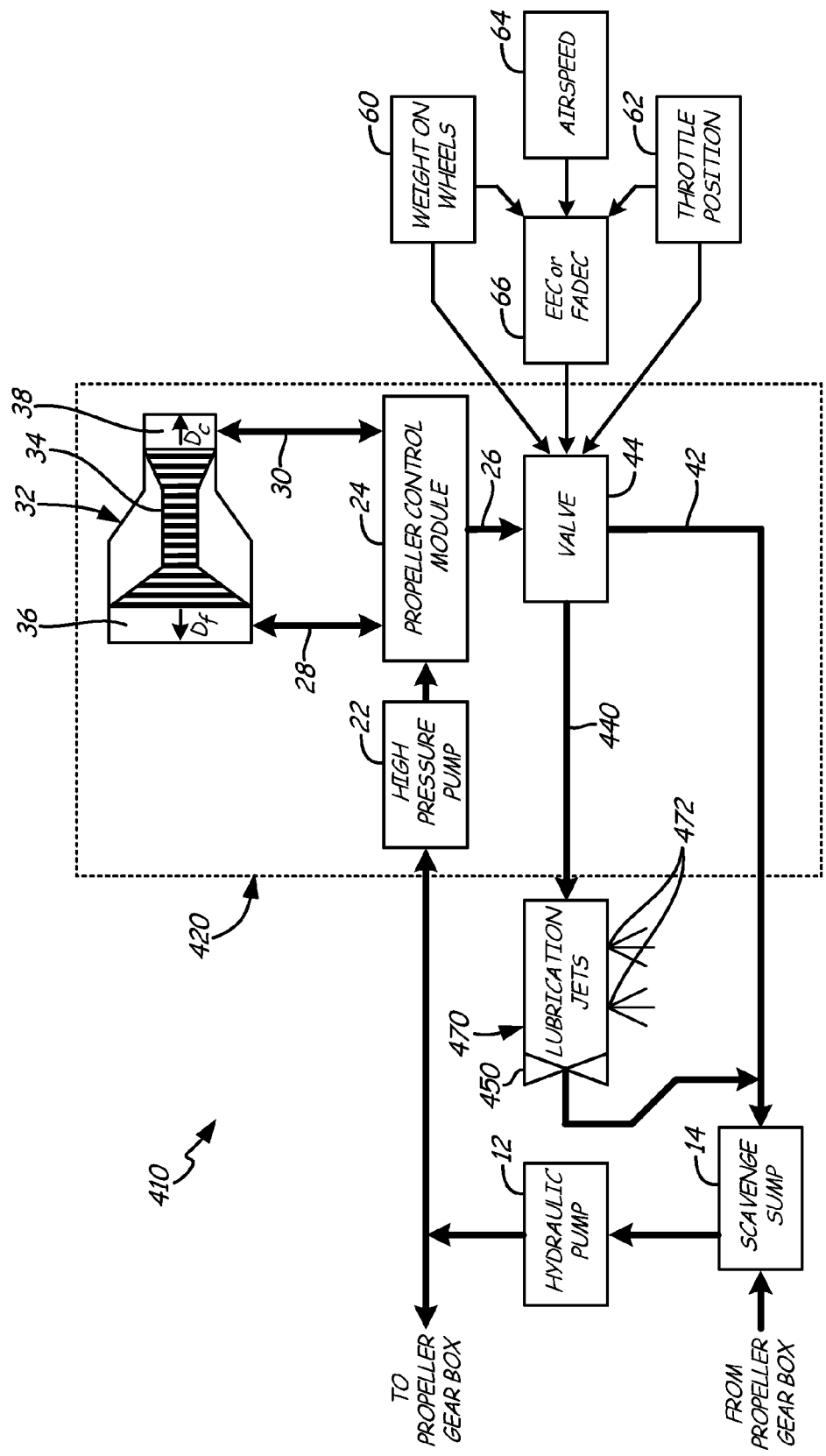
FIG. 4 is a schematic representation of another embodiment of a powerplant lubrication and blade pitch actuation system of the present invention.

FIG. 4 is a schematic representation of another embodiment of a powerplant lubrication and blade pitch actuation system of the present invention. The embodiment of FIG. 4 is like the embodiment of FIG. 1, except that in powerplant lubrication and blade pitch actuation system 410, the drain line restriction is orifice 450. Orifice 450 is part of lubrication system 470, which also includes lubrication jets 472. Lubrication system 470 employs the hydraulic fluid from first drain line 440 to perform a function generally useful during operation of the aircraft—lubricating mechanical components (e.g. the gear box). Orifice 450 produces back pressure sufficient for lubrication jets 472 to spray the hydraulic fluid (also employed as a lubricant) on the mechanical components. This function is generally only of critical importance when the aircraft is in flight. Thus, in the embodiment of FIG. 4, valve 44 may be directed to bypass lubrication system 470 and orifice 450 to provide increased pressure force for reverse thrust while landing. During landing, the increased pressure force is necessary for a limited time (while landing) and bypassing lubrication system 470 and orifice 450 for a limited time is not detrimental to the operation or longevity of the aircraft.

In the present invention, a propeller blade pitch actuation system is provided with a greater hydraulic pressure force by employing a valve to selectively connect a propeller control module drain line to either a drain line having a drain line restriction or, under conditions where a larger pressure force is required by the propeller control module, to a lower-pressure drain line without the drain line restriction. Making a greater hydraulic pressure force available to move a propeller actuator piston in this way eliminates the need for heavier or more expensive pumps, pressure actuators, lines, and fittings that would otherwise be required. In some embodiments, bypassing the drain line restriction to provide increased pressure force is employed when the aircraft is on the ground when full reverse is desired and when bypassing the drain line restriction for such a short time is not detrimental to the operation or longevity of the aircraft.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A propeller blade pitch actuation system comprising:
   a propeller control module (PCM) for adjusting blade pitch on at least one propeller blade;
   a PCM drain line connected to the PCM to drain hydraulic fluid employed in adjusting the propeller blade pitch;
   a first drain line downstream of the PCM drain line;
   a drain line restriction connected to the first drain line;
   a second drain line downstream of the PCM drain line; and
   a valve comprising a first valve position and a second valve position, the first valve position connecting the PCM drain line to the first drain line through the valve, and the second valve position connecting the PCM drain line to the second drain line through the valve;
   wherein hydraulic pressure of the first drain line between the valve and the drain line restriction is greater than hydraulic pressure of the second drain line.

2. The propeller blade pitch actuation system of claim 1, wherein the propeller blade pitch actuation system is aboard an aircraft, the valve is an electromechanical valve, and the electromechanical valve switches from the first valve position to the second valve position in response to an electrical signal indicating the aircraft is not in flight.

3. The propeller blade pitch actuation system of claim 2, wherein the electrical signal is generated at least partially in response to a sensor detecting weight on wheels of the aircraft.

4. The propeller blade pitch actuation system of claim 2, wherein the electrical signal is generated by at least one of an electronic engine controller and a full authority digital engine controller.

5. The propeller blade pitch actuation system of claim 4, wherein the electrical signal is generated at least partially in response to an airspeed sensor detecting airspeed below an airspeed necessary for the aircraft to be in flight.

6. The propeller blade pitch actuation system of claim 4, wherein the electrical signal is generated at least partially in response to an engine throttle position.

7. The propeller blade pitch actuation system of claim 1, wherein the propeller blade pitch actuation system is aboard an aircraft, the valve is an electromechanical valve, and the electromechanical valve switches from the first valve position to the second valve position in response to an electrical signal indicating an engine throttle is in a reverse position.

8. The propeller blade pitch actuation system of claim 1, wherein the drain line restriction includes a tank for storing hydraulic fluid to be employed by the PCM in the event of a failure of a supply of hydraulic fluid to the system.

9. The propeller blade pitch actuation system of claim 8, wherein system further includes an auxiliary pump connecting the tank to the PCM, wherein the auxiliary pump provides hydraulic fluid from the tank to the PCM to adjust the propeller blade pitch to a feathered position.

10. A powerplant lubrication and blade pitch actuation system comprising:
    a propeller blade pitch actuation system comprising:
       a propeller control module (PCM) for adjusting blade pitch on at least one propeller blade;
       a PCM drain line connected to the PCM to drain hydraulic fluid employed in adjusting the propeller blade pitch;
       a first drain line downstream of the PCM drain line;
       a second drain line downstream of the PCM drain line; and
       a valve comprising a first valve position and a second valve position, the first valve position connecting the PCM drain line to the first drain line, and the second valve position connecting the PCM drain line to the second drain line; and
    a drain line restriction connected to the first drain line, wherein the drain line restriction comprises an orifice to increase hydraulic pressure in the first drain line between the valve and the orifice;
    wherein a hydraulic pressure of the first drain line between the valve and the drain line restriction is greater than a hydraulic pressure of the second drain line.

11. The powerplant lubrication and blade pitch actuation system of claim 10, wherein the drain line restriction comprises a heat exchanger.

12. The powerplant lubrication and blade pitch actuation system of claim 10, wherein the first drain line provides hydraulic fluid to at least one lubrication jet between the valve and the orifice.

13. The powerplant lubrication and blade pitch actuation system of claim 10, wherein the powerplant lubrication and blade pitch actuation system is aboard an aircraft, the valve is an electromechanical valve, and the electromechanical valve switches from the first valve position to the second valve position in response to at least an electrical signal indicating an engine throttle is in a reverse position.

14. The powerplant lubrication and blade pitch actuation system of claim 13, wherein the electromechanical valve switches from the first valve position to the second valve position further in response to a sensor detecting weight on wheels of the aircraft.

15. A method for selectively increasing a hydraulic pressure force available to a propeller control module (PCM) of a propeller blade pitch actuation system for an aircraft, the method comprising:
    detecting a condition requiring increased hydraulic pressure force;
    signaling a valve to change position in response to the detected condition; and
    changing the valve position to decrease hydraulic pressure at a drain line for the PCM, changing the valve position comprising:
       disconnecting the drain line for the PCM from a drain line including a flow restriction, wherein the flow restriction comprises at least an orifice for increasing drain line pressure to provide hydraulic fluid to at least one lubrication jet; and
       connecting the drain line for the PCM to a drain line at a lower hydraulic pressure than the drain line including the flow restriction.

16. The method of claim 15, wherein detecting the condition requiring increased hydraulic pressure force comprises at least one of:

sensing weight on wheels of the aircraft;
sensing airspeed below an airspeed necessary for the aircraft to be in flight; and
sensing engine throttle in a reverse position.

17. The method of claim 15, wherein the flow restriction comprises at least an auxiliary hydraulic fluid storage tank for storing hydraulic fluid to be employed by the PCM in the event of a failure of a supply of hydraulic fluid to the propeller blade pitch actuation system.

18. The method of claim 15, wherein the flow restriction comprises at least a heat exchanger.

\* \* \* \* \*